(12) United States Patent
Matson et al.

(10) Patent No.: US 7,563,915 B2
(45) Date of Patent: Jul. 21, 2009

(54) GREEN BIODIESEL

(75) Inventors: Jack Vincent Matson, State College, PA (US); Dheeban Chakravarthi Kannan, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 11/807,458

(22) Filed: May 29, 2007

(65) Prior Publication Data

US 2007/0282119 A1    Dec. 6, 2007

Related U.S. Application Data

(60) Provisional application No. 60/809,227, filed on May 30, 2006.

(51) Int. Cl.
*C11C 3/00* (2006.01)
*C10L 1/18* (2006.01)

(52) U.S. Cl. .................. 554/167; 554/169; 554/170; 44/388

(58) Field of Classification Search .............. 44/388; 554/167, 169, 170
See application file for complete search history.

(56) References Cited

U.S. PATENT DOCUMENTS

| | | | |
|---|---|---|---|
| 6,056,793 A | 5/2000 | Suppes | |
| 6,437,088 B1 | 8/2002 | Duan | |
| 6,812,359 B2 * | 11/2004 | Goto et al. | 554/170 |
| 6,818,026 B2 * | 11/2004 | Tateno et al. | 44/385 |
| 6,887,283 B1 | 5/2005 | Ginosar et al. | |
| 7,045,100 B2 | 5/2006 | Ergun et al. | |
| 7,112,229 B2 | 9/2006 | Khalil et al. | |
| 7,138,536 B2 | 11/2006 | Bournay et al. | |
| 7,247,739 B2 | 7/2007 | Gapes et al. | |
| 2002/0035282 A1 | 3/2002 | Suppes | |
| 2003/0032826 A1 | 2/2003 | Hanna | |
| 2004/0074760 A1 | 4/2004 | Portnoff et al. | |
| 2006/0014840 A1 | 1/2006 | Schmidt et al. | |
| 2006/0224005 A1 | 10/2006 | Felly | |
| 2007/0137097 A1 | 6/2007 | Ikura | |
| 2007/0144060 A1 | 6/2007 | Ikura | |

FOREIGN PATENT DOCUMENTS

JP          2003055299      *    2/2003

OTHER PUBLICATIONS

Goto et al., Method for preparation of fatty acid esters and fuel containing fatty acid esters, 2003 (translation of JP2003055299).*

(Continued)

*Primary Examiner*—Daniel M Sullivan
*Assistant Examiner*—Yate' K Cutliff
(74) *Attorney, Agent, or Firm*—Barbara E. Johnson, Esq.

(57) ABSTRACT

Methods for improved manufacture of green biodiesel focus on the selection and use of one or more solid metallic oxide base catalyst(s) selected from the group consisting of calcium oxide (CaO), calcium aluminum oxide (CaO—$Al_2O_3$), calcium titanate ($CaTiO_3$), barium titanate ($BaTiO_3$), magnesium aluminum oxide (MgO—$Al_2O_3$), zinc oxide (ZnO), copper (II) oxide (CuO), nickel oxide (NiO), manganese oxide (MnO), titanium oxide (TiO), vanadium oxide (VO), cobalt oxide (CoO), iron oxide (FeO), chromite ($FeCr_2O_4$), hydrotalcite ($Mg_6Al_2(CO_3)(OH)_{16} \cdot 4(H_2O)$), magnetite ($Fe_3O_4$), magnesium silicate and calcium silicate.

10 Claims, 2 Drawing Sheets

Performance of the catalysts with temperature without cosolvent in the batch reaction.

OTHER PUBLICATIONS

Cao et al. Prepartion of biodiesel from soybean oil using supercritical methanol and co-solvent, 2004, Fuel, 84, pp. 347-351.*

Minami et. al., Kinetics of hydrolysys and methyl esterification for biodiesel production in two-step supercritical methanol process, May 26, 2006, Fuel, 85, pp. 2479-2483.*

Ma, Fangrui, et al., "Biodiesel production: a review," Bioresource Today, 1999, pp. 1-15, vol. 70, Elsevier Science, B.V., The Netherlands, see esp. pp. 7-10.

Demirbas, Ayhan, "Biodiesel from vegetable oils via transfesterification in supercritical methanol," 2002, pp. 2349-2356, vol. 43, Elsevier Science Ltd. USA/UK.

Kusdiana, D., et al., "Kinetics of transesterification in rapeseed oil to biodiesel fuel . . . methanol," Fuel, 2001, pp. 693-698, vol. 80, Elsevier Science Ltd. USA/UK.

Kim, Hak-Joo et al., "Transesterification of vegetable oil to biodiesel . . . catalyst," Catalysis Today, 2004, pp. 315-320, vol. 93 No. 95, Elsevier Sci. Ltd. USA/UK.

Saka, S. et al., "Biodiesel fuel from rapeseed oil as prepared in supercritical methanol," Fuel, 2001, pp. 225-231, vol. 80, Elsevier Science Ltd., USA/UK.

Eiji, Minami et al., "Kinetics of hydrolysis and methyl esterification for biodiesel . . . process," Fuel, 2006, pp. 2479-2483, vol. 85, Elsevier Ltd. USA/UK.

Cao, Weiliang et al., "Preparation of biodiesel from soybean oil using supercritical methanol and co-solvent," 2005, pp. 347-351, Fuel, vol. 84, Elsevier Ltd. USA/UK.

* cited by examiner

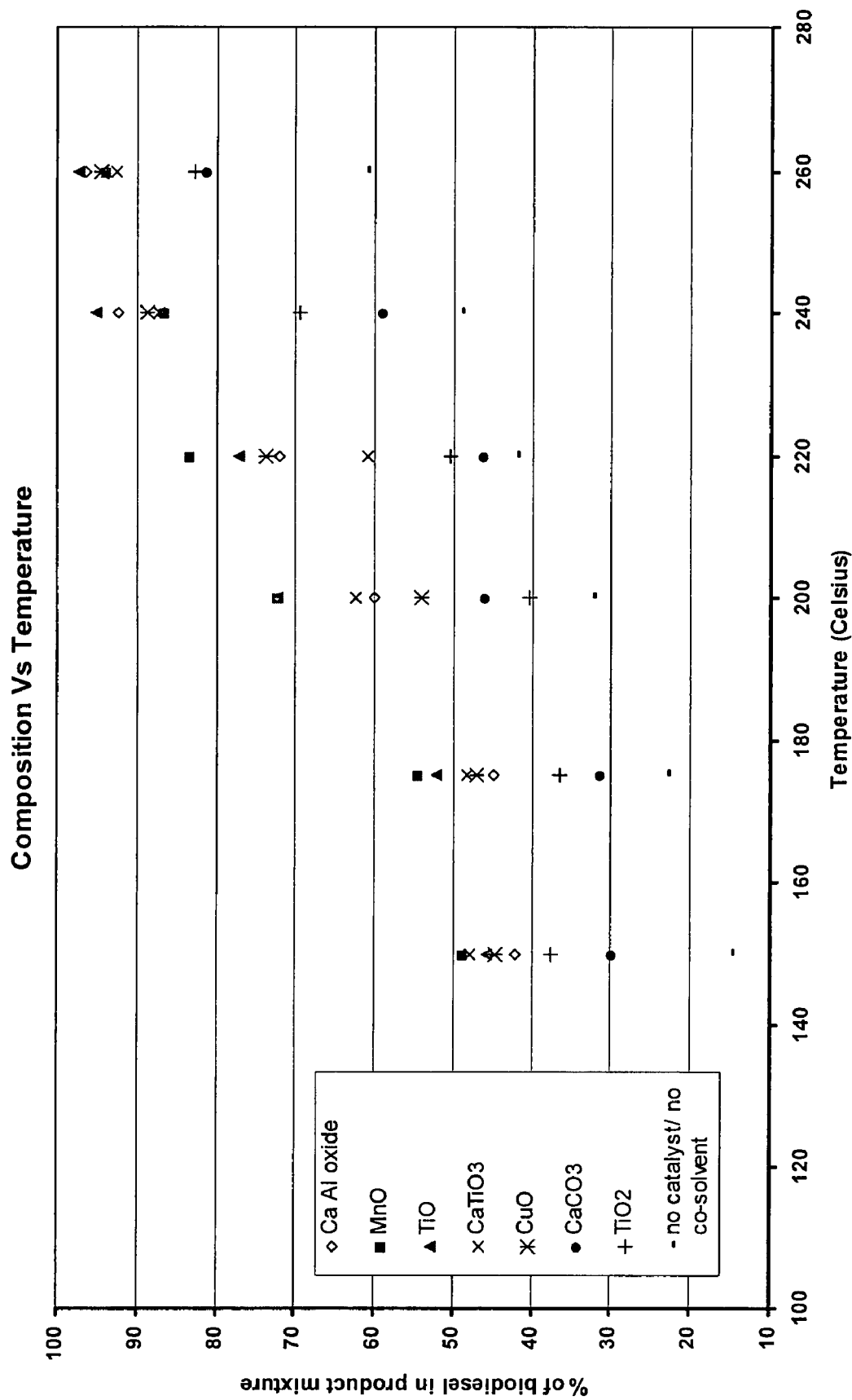
Figure 1. Performance of the catalysts with temperature without cosolvent in the batch reaction.

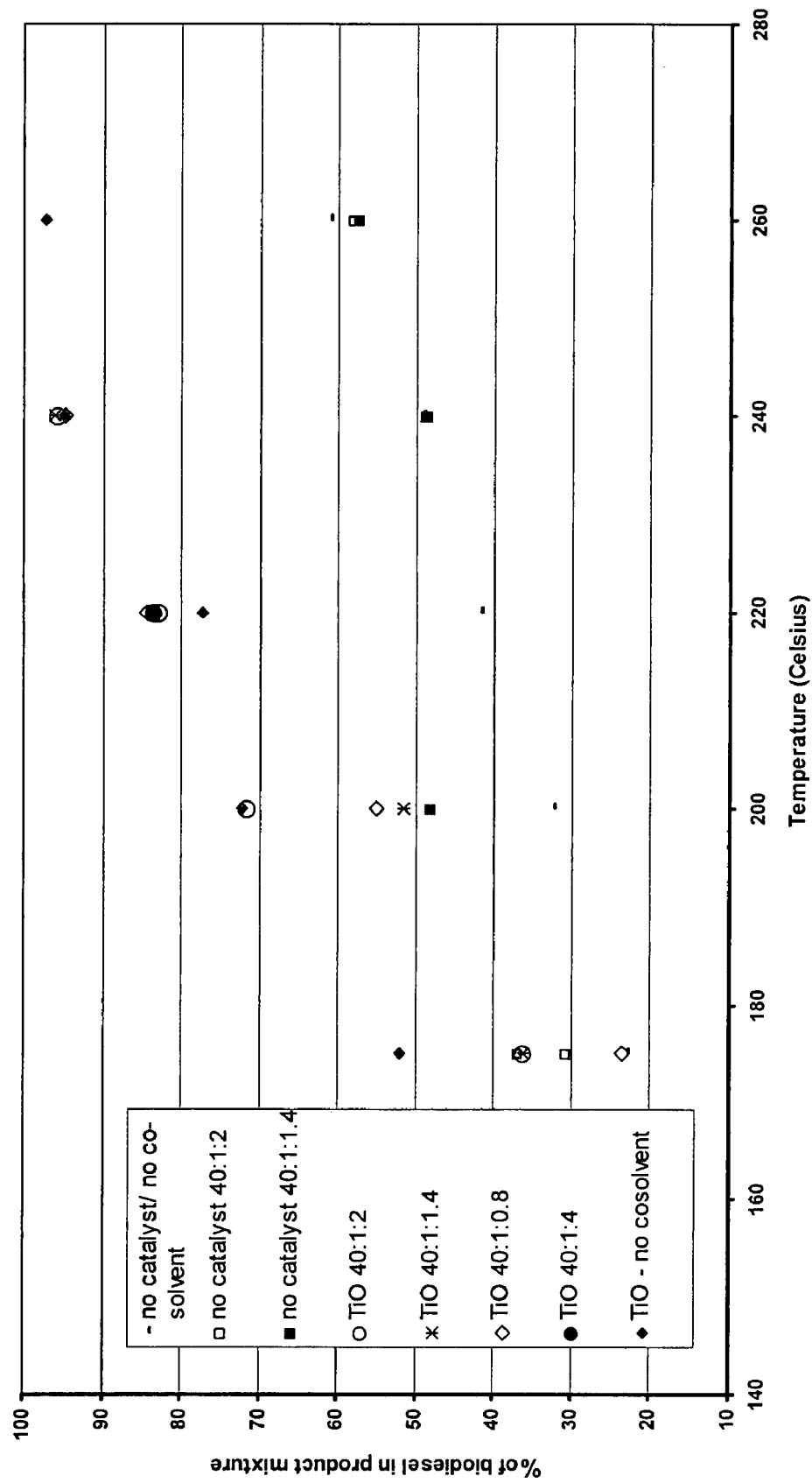
Figure 2. Effect of cosolvent on the batch reaction.

GREEN BIODIESEL

CROSS-REFERENCE TO RELATED APPLICATION

This application claims the benefit of U.S. Provisional Application Ser. No. 60/809,227, filed May 30, 2006, which is herein incorporated by reference in its entirety.

BACKGROUND OF THE INVENTION

1. Field of the Invention

The present invention pertains to improved methods for manufacturing the renewable energy source fuel commonly known as biodiesel.

2. Description of Related Art

Biodiesel is a mixture of fatty acid alkyl esters produced, ordinarily, from a plant source. Typically a mixture of methyl or ethyl esters is produced from a transesterification reaction involving triglyceride esters, vegetable oil and an alcohol, ordinarily methanol or ethanol, which yield glycerol as a by-product. (When the reaction involves free fatty acids specifically, it is an esterification rather than a transesterification, as those skilled in the art understand.) The methyl and ethyl esters are similar to petroleum diesel in structure and properties as fuels, which makes biodiesel suitable for routine use in present-day diesel engines.

There are various reasons further to develop biodiesel as a commercial fuel source. Interest in renewable energy resources increases every year. One reason pertains to inexorable fossil fuel reserve depletion; another is the environmental concern of fossil fuel carbon dioxide emissions and their notorious greenhouse effects. National security is also a consideration in fuels development, because even in the absence of fossil fuel reserve depletion there are severe geopolitical constraints on fossil fuel markets. Biodiesel as a fuel initiative can revitalize agriculture as an industry and even create new agricultural specialties. For example, a new agricultural specialty would be marine agriculture devoted to biodiesel production, in which oil from salt-water algae creates entire new economies and job opportunities. Also important are the environmental benefits of recycling, and used vegetable oil is a much-underused recyclable commodity in the United States today. Among the many renewable alternative energy options currently available, biodiesel has the potential to enable a smooth transition to new fuel sources because present day diesel engines require no modification in order to burn biodiesel. In fact, when Rudolf Diesel invented the diesel engine he designed it to burn peanut oil, not a fossil fuel. As fossil based fuel prices rise in contrast with the reduction of biodiesel prices over time, the commercial viability of biodiesel becomes more real every day, particularly because diesel yields almost twice the mileage per gallon as gasoline does.

Although biodiesel is being produced currently using liquid catalysts, separation issues are a challenge due to the solubility of such liquid catalysts. Separation issues which are a nuisance at a pilot batch level can create significant obstacles at scaled-up, commercial production levels. In traditional biodiesel manufacturing methods, liquid catalyst is retained in both the biodiesel and glycerol phases of the reaction product, although most of the soluble catalyst is dissolved in the glycerol phase. The traditional way to remove the catalyst was to precipitate it as a salt using an acid, which was energy intensive, and then the regeneration of the salted catalyst was cost prohibitive. Accordingly, a need remains for biodiesel manufacturing methods which rely predominantly or solely on solid catalysts, to overcome the separation issue which is a major manufacturing challenge in biodiesel production today.

SUMMARY OF THE INVENTION

In order to meet this need, the present invention substitutes at least one solid metallic oxide base catalyst for the biodiesel transesterification catalysts of the prior art, and in so doing creates a "green" biodiesel which is particularly environmentally advantageous not only because it comes from an easily renewable (vegetable oil) source and does not use the fossil-fuel industry associated alkali hydroxide liquid catalyst, but also because the solid catalyst produces less waste and saves significant processing time and energy in the manufacturing process. Solid catalysts avoid waste water disposal problem associated with the conventional processes using liquid catalysts. The metallic oxide base catalyst is selected from the group consisting of calcium oxide (CaO), calcium aluminum oxide (CaO—$Al_2O_3$), calcium titanate ($CaTiO_3$), barium titanate ($BaTiO_3$), magnesium aluminum oxide MgO—$Al_2O_3$), zinc oxide (ZnO), copper (II) oxide (CuO), nickel oxide (NiO), manganese oxide (MnO), titanium oxide (TiO), vanadium oxide (VO), cobalt oxide (CoO), iron oxide (FeO), chromite ($FeCr_2O_4$), hydrotalcite ($Mg_6Al_2(CO_3)(OH)_{16}$·4 ($H_2O$), and magnetite ($Fe_3O_4$). The preferred metallic oxide base catalysts are selected from the group consisting of CaO—$Al_2O_3$, CaO—$TiO_2$, CuO, MnO and TiO and the most preferred are CuO, MnO and TiO. Alternatively, calcium silicate or magnesium silicate may be used as the catalyst. The catalyst is used to transesterify a triglyceride, such as vegetable oil, with an alcohol, such as methanol or ethanol preferably, at reaction temperatures between about 60-450° C., preferably 70-300° C., and most preferably 150-260° C., and at ambient or elevated pressure and with or without typical biodiesel manufacturing cosolvents. In a particularly preferred practice of the invention the catalyst is TiO, the temperature is at least 220° C. and the pressure used is around 70 atmospheres, the latter allowing the process to accommodate critical and near-critical regimes of the alcohol.

BRIEF DESCRIPTION OF THE DRAWINGS

FIG. 1 is a graph showing comparative biodiesel production percentage for different catalysts used in the batch reaction without cosolvent.

FIG. 2 is a graph showing comparative biodiesel production percentages for different catalysts used in the batch reaction with cosolvent.

DESCRIPTION OF THE PREFERRED EMBODIMENTS

The basic reaction between a triglyceride, such as vegetable oil, and an alcohol, such as methanol, is shown below in Formula I.

FORMULA I

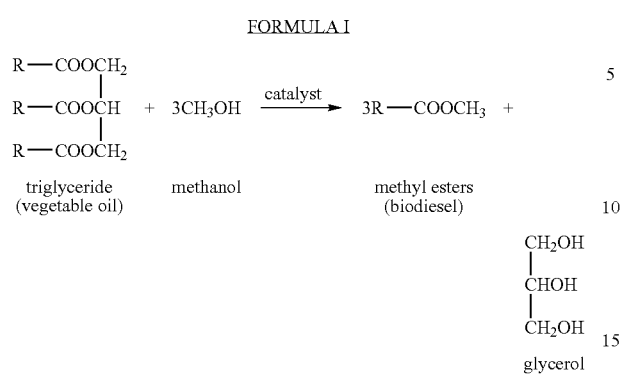

triglyceride    methanol    methyl esters
(vegetable oil)             (biodiesel)

$$\begin{array}{c} CH_2OH \\ | \\ CHOH \\ | \\ CH_2OH \end{array}$$

glycerol

The transesterification of a triglyceride with methanol gives methyl esters (biodiesel) and glycerol as a byproduct. The key to the transesterification reaction is the production of alkoxide ions such as methoxide ($CH_3O^-$), ethoxide ($C_2H_5O^-$) and etc. The conventional process involves production of these alkoxide ions using liquid base catalysts. When using such base catalysts the reaction mechanism is a nucleophilic substitution reaction as illustrated in the following Formula II, in which methanol reacts with the base catalyst, sodium hydroxide, to form sodium methoxide. The negatively charged methoxide ion from sodium methoxide attacks the carbon atom double bonded to oxygen and is slightly positively charged due to polarization of double bond electrons towards the more electronegative oxygen atom. The resulting schematics following this attack, as shown in Formula II, result in the formation of a methyl ester. When the conventional sodium hydroxide is used, the temperature of the reaction must be about 60-70° C. and the process requires on the order of about an hour and a half. The reaction mixture has to be stirred constantly using a stirrer (as is used in continued stirred tank reactors) and a condenser is necessary to condense the alcohol continuously, whose boiling temperature is in the range of the reaction temperature.

FORMULA II $$CH_3OH + NaOH \longrightarrow CH_3ONa + H_2O$$

$$CH_3ONa \rightleftharpoons CH_3O^- + Na^+$$

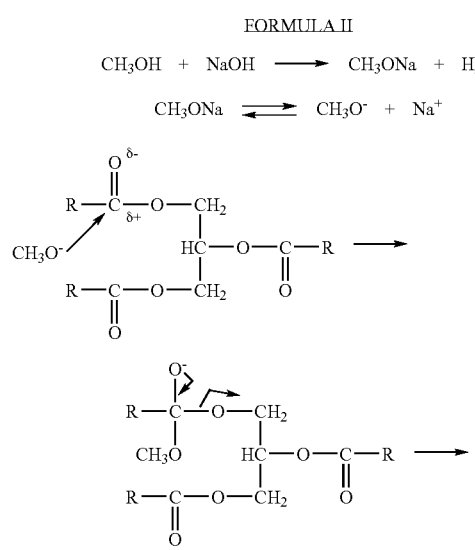

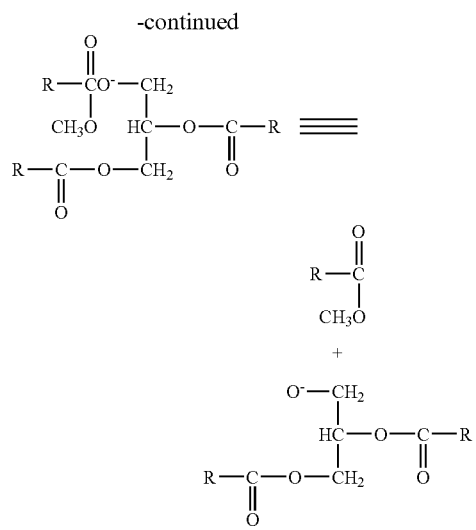

In the practice of the present invention, vegetable oil (including recycled vegetable oil such as used cooking oil) is the main raw material used to prepare the present green biodiesel. In transesterifying the vegetable oil the alcohol of choice is normally ethanol or methanol. When a choice of vegetable oil is possible, the most preferred oil source in the U.S. is soybean oil, whereas rapeseed oil is the preferred oil in Europe, and palm oil and castor oil are prevalent in Asia. As mentioned above, it is possible to extract oil from unicellular algae grown in salt water, and notably the oil fraction of such algae is about 50% of its dry weight.

The present invention substitutes a solid metallic oxide base catalyst for the biodiesel transesterification catalysts of the prior art, and in so doing creates a green biodiesel which is particularly environmentally advantageous not only because it comes from an easily renewable (vegetable oil) source, but because the solid catalyst saves significant processing time and energy in the manufacturing process, which need not involve complicated catalyst separation or extensive regeneration. By saving time and energy in the manufacturing process, the environmental benefit is both direct and indirect, because the enhanced commercial feasibility of biodiesel manufactured according to the present method ensures a plentiful and cost-effective supply which in turn encourages its purchase, use and concomitant reduction of fossil fuel emissions.

The metallic oxide base catalyst is selected from the group consisting of calcium oxide, calcium aluminum oxide ($CaO-Al_2O_3$), calcium titanate ($CaTiO_3$), barium titanate ($BaTiO_3$), magnesium aluminum oxide ($MgO-Al_2O_3$), zinc oxide (ZnO), copper (II) oxide (CuO), nickel oxide (NiO), manganese oxide (MnO), titanium oxide (TiO), vanadium oxide (VO), cobalt oxide (CoO), iron oxide (FeO), chromite ($FeCr_2O_4$), hydrotalcite ($Mg_6Al_2(CO_3)(OH)_{16}\cdot 4(H_2O)$), and magnetite ($Fe_3O_4$). The preferred metallic oxide base catalysts are any one or more of the catalysts selected from the group consisting of $CaO-Al_2O_3$, $CaO-TiO_2$, CuO, MnO and TiO and the most preferred are CuO, MnO and TiO. Alternatively, calcium silicate or magnesium silicate may be used as the catalyst. The catalyst is used to transesterify a triglyceride, such as vegetable oil, with an alcohol, such as methanol or ethanol preferably, at reaction temperatures between about 60-450° C., preferably 70-300° C., and most preferably 150-260° C., and at ambient or elevated pressure and with or without typical biodiesel manufacturing cosolvents. In a particularly preferred practice of the invention the catalyst is TiO or MnO, the temperature is at least 220° C. and the pressure used is around 70 atmospheres, the latter allowing the process to accommodate critical and near-critical regimes of the alcohol. The alcohol is both a reactant and a critical fluid medium in the critical regime. Thus, the alcohol is both a reactant and cosolvent in the critical regime for maximum miscibility and reaction with the fatty acid raw material.

The first metallic oxide base to be investigated was calcium oxide (CaO), inasmuch as it is one of the prominent oxides that does not dissolve in alcohol and has the basic characteristic of all the present catalysts. Although calcium oxide is an effective solid catalyst for biodiesel transesterification, it is candidly noted here that its use did result in some unwanted saponification. Calcium oxide is usually considered to be insoluble in polar solvents, but in truth it is sparingly soluble and thus not completely insoluble at all. Calcium oxide has some innately attached water molecules (about 5-10%) that cannot be separated until it is heated above 1000° C.; this aqueous fraction accounts for the unwanted saponification. Fortunately, the soap thus formed is physically in the form of soap flakes, i.e., calcium salt of fatty acids, so separation and removal of the soap flakes from the resulting biodiesel is not insurmountable. Having said that, some of the other metallic oxide base catalysts are more preferred than the calcium oxide due to reduced or eliminated saponification.

The metallic oxide base catalyst need not be calcium oxide, but can be selected from the group consisting of calcium aluminum oxide ($CaO-Al_2O_3$), calcium titanate ($CaO-TiO_2$), barium titanate ($BaO-TiO_2$), magnesium aluminum oxide ($MgO-Al_2O_3$), zinc oxide (ZnO), copper (II) oxide (CuO), nickel oxide (NiO), manganese oxide (MnO), titanium oxide (TiO), vanadium oxide (VO), cobalt oxide (CoO), iron oxide (FeO), chromite ($FeCr_2O_4$), hydrotalcite ($Mg_6Al_2(CO_3)(OH)16.4(H_2O)$), and magnetite ($Fe_3O_4$). Of these metallic oxide base catalysts, the preferred are selected from the group consisting of $CaO-Al_2O_3$, $CaO-TiO_2$, CuO, MnO and TiO and the most preferred are CuO, MnO and TiO. Of the master list, in thin layer chromatography (TLC) experimental trials, $CaO-Al_2O_3$, $CaO-TiO_2$, CuO, MnO and TiO showed almost complete conversion of vegetable oil to biodiesel and glycerol which was confirmed by gas chromatography analysis. Of the $CaO-Al_2O_3$, $CaTiO_3$, CuO, MnO and TiO catalysts, MnO and TiO are the most preferred.

To study the behavior of the catalysts confirmed to be effective, it was investigated to determine reactivity upon relatively decreased temperature. As a result, performances of certain catalysts were tested at various temperatures from 150° C. to 260° C. and the results are shown in FIG. 1. The results of calcium carbonate are also shown in FIG. 1 for comparison purposes. In addition, titanium (IV) oxide ($TiO_2$) was also tested at these temperatures and the results were shown in FIG. 1 as well. The lower-most plot corresponds to the runs in which no catalyst at all was used. Of all the catalysts shown in FIG. 1, TiO appears to be the most effective, giving yields of 97% biodiesel at 260° C. and even at 240° C. the TiO yields are still 95%—which represents a commercially viable yield at 240° C. Without a catalyst at all, the yield is about 60% at 260° C., whereas the promising catalysts show yields of around 45-50% even at 150° C. Apart from these, there are not significant differences between the catalysts shown in FIG. 1, which gave yields around 92-97% at lower temperatures.

In theory, although there is no intention to be bound by the theory, the reaction mechanism of the solid catalysts is possibly that the hydrogen in the hydroxyl group of the alcohol becomes attached to the electron-pair donating sites of the metallic oxides. As this hydrogen atom gets adsorbed to the solid catalyst, the remaining part of the alcohol, namely, the alkoxide ion for oxide catalysts (such as ethoxide) is capable of attacking the partially positively charged carbon atom of the carbonyl bond of the triglyceride ester, similarly to the methoxide ion attack described above in the basic reaction mechanism.

The present catalysts may be used with or without cosolvent because they work either way. It was postulated that as temperature is lowered below 240° C., it might mean that the lower temperatures were below the critical point of the alcohol such as ethanol and that, in turn, the oil and alcohol were in two different phases and the immiscibility and resulting mass transfer limitation would detract from the overall reaction. This suggested the use of a cosolvent to improve miscibility. Based on the cosolvent molar ratios employed in other biodiesel processes, it was desired to test three molar ratios 40:1:2, 40:1:1.4 and 40:1:0.8 ethanol:oil:cosolvent with TiO as the catalyst for testing purposes. The results of the tests are shown in FIG. 2. A point corresponding to a molar ratio of 40:1:4 with TiO catalyst is also shown. As seen from FIG. 2 the use of a cosolvent does not seem to have any significant effect in improving the reaction yield, and it should be borne in mind that a 40:1:4 run itself means that the cosolvent makes up about 10% of the reaction mixture, so that any more cosolvent than that would be uneconomical in any case. Two series of runs employing cosolvent without any catalyst corresponding to molar ratios of 40:1:2 and 40:1:1.4 were also conducted and the results appear in FIG. 2. Again, the use of the cosolvent does not appear to change the overall reaction yields.

In summary, then, the present transesterification reactions of fatty acid-containing raw materials and one or more alcohols take place in either batch or continuous reaction equipment as is used for biodiesel production already known in the art. The fatty-acid starting materials can be literally any fatty-acid rich material such as vegetable oil, used vegetable oil, restaurant waste grease, or surplus liquid or solid fats such as vegetable shortenings, surplus margarine or similar fatty acid compositions. Any animal or vegetable fat or oil may be used, with additional processing if necessary to accommodate its characteristics according to the skill of the art. For example, restaurant waste grease requires simple extra processing before reaction to remove excess water and to filter out precipitates and other sludge, but to do this is already known in the biodiesel arts. The alcohol reactant can be literally any alcohol, although methanol, ethanol, propanol and butanol are preferred and methanol and ethanol are most preferred. A mixture of two or more alcohols may be used and, in certain instances, $C_1$-$C_4$ diols may be used although mono-ols are preferred. Volume of reaction is unlimited as long as effective stirring of the reactants can be achieved, either by a mechanical stirrer in a batch reactor or by appropriate drumming or tumbling in a continuous reactor. In lieu of stirring per se, it is possible to use a continuous packed-bed reactor known in the art, which obviates either stirring or tumbling. Proportions of alcohol to fatty acid raw material are preferably about 40:1 but can range within 35:2 and even 30:3 or any ratio in between or that will yield a suitable transesterification. The amount of solid catalyst to use can vary depending on the reactants. In many cases, as a practical matter, the solid catalyst comprises 1~20% by weight of the reaction mixture. Choice of quantity of solid catalyst is known in the art, and the invention inheres in the choice of the actual catalyst to improve the overall production of the present biodiesel.

Although other physical forms of solid catalyst may be used, typically the solid catalysts of the present invention are provided in a particle or powdered form with particle sizes and particle size distributions typical of solid catalysts in industry. The governing parameter for particle size and particle size distribution is not any particular range, the design of which is well within the ordinary skill of the art. When continuous reactors are used the catalyst(s) are generally immobilized in a matrix bed and provided in line for plug flow. Immobilization of solid catalysts on a matrix for plug flow is well known in the industrial arts. Reaction temperatures are generally between about 60-450° C., preferably 70-300° C., and most preferably 150-260° C., and the reaction may be conducted at ambient or elevated pressure (anywhere between 1 and 500 atmospheres, more preferably between 1 and 70 atmospheres) and with or without typical biodiesel manufacturing cosolvents such as hexane. Reaction times range from 5 minutes to one hour and can even be 5-20 minutes and in many cases 5-10 minutes.

The invention claimed is:

1. A method for improved manufacture of green biodiesel, comprising conducting a transesterification of a fatty acid raw material source with at least one alcohol in the presence of a solid catalyst, wherein the at least one alcohol is present in a proportion of alcohol to fatty acid raw material of at least 35:2, further wherein the at least one alcohol is in its critical or near-critical state, and wherein the solid catalyst is selected from the group consisting of MnO, TiO and CuO.

2. The method according to claim 1, wherein the transesterification is conducted during a reaction time of 5-20 minutes and said alcohol contains from 1 to 4 carbons.

3. The method according to claim 1, wherein the transesterification is conducted during a reaction time of 5-10 minutes and said alcohol contains from 1 to 4 carbons and the catalysts are TiO or MnO.

4. The method according to claim 1, wherein the transesterification is conducted at a temperature of between about 60-450° C. and at a pressure between about 1-500 atmospheres.

5. The method according to claim 1, wherein the transesterification is conducted at a temperature of between 70-300° C. and at a pressure between about 1-70 atmospheres.

6. The method according to claim 1, wherein the transesterification is conducted at a temperature of between 220-260° C. and between 40-80 atmospheres.

7. The method according to claim 1, wherein the transesterification is conducted at a temperature of between 150-260° C. and at a pressure between about 1-70 atmospheres.

8. The method according to claim 1, wherein the transesterification is conducted at a temperature of 220° C. or higher and at a pressure of about 70 atmospheres.

9. The method according to claim 1, wherein the reaction which occurs as to any free fatty acids present in the fatty acid raw material is an esterification reaction.

10. The method according to claim 1, wherein the reaction is conducted in the presence of at least one cosolvent.

* * * * *